3,148,162
METHOD OF MAKING A POLYETHERURETHANE USING AN AROMATIC TIN CATALYST
George T. Gmitter and Emery V. Braidich, Akron, Ohio, assignors to The General Tire & Rubber Company, Akron, Ohio, a corporation of Ohio
No Drawing. Filed Apr. 27, 1960, Ser. No. 24,899
14 Claims. (Cl. 260—2.5)

This invention relates to polyetherurethanes and to methods for making the same. More particularly, it relates to polyetherurethanes, especially flexible, cellular or foamed polyetherurethane compositions or products, and to methods for making the same.

It has been observed that in the preparation of polyetherurethanes in large masses, the centers of the materials become crumbly (easily broken into small pieces, friable) and discolored during the curing process and after heat aging. This has become particularly noticeable in the manufacture of foams, such as flexible polyetherurethane foams, by a "One-Shot" process where all of the materials are mixed together at one time and then foamed, particularly where certain catalysts are used. It is not known precisely what causes the degradation of these foams although it may be due to the fact that the heat necessary to cause reaction plus the exothermic heat of reaction results in reversion of the material, possibly due to the catalyst, decomposition products as the catalyst and/or to oxygen. Since the cellular masses act as insulators, much of the heat is trapped for a considerable period of time which may facilitate this degradation or reversion. Even if the foams are otherwise satisfactory initially, they may seriously degrade when heated for extended periods of time. Thus, it would be highly desirable to provide a process or method whereby the degradation on curing and aging of polyurethanes can be avoided so that products are obtained which are not crumbly or discolored after curing and heat aging.

It, therefore, is an object of the present invention to provide a method for making a polyetherurethane exhibiting improved resistance to heat degradation.

It is another object of this invention to provide a method for making a flexible polyetherurethane cellular or foam product, particularly by the "One-Shot" process, which exhibits improved dry heat aging and freedom from crumbling and discoloration.

Still another object is to provide a polyetherurethane having a high resistance to heat degradation.

A further object is to provide a flexible polyetherurethane foam, cellular composition and/or product in which the center of the foam is non-crumbly and substantially free of discoloration after curing and which exhibits little or no degradation after extended dry heat aging.

These and other objects and advantages of the present invention will become more apparent to those skilled in the art from the following detailed description and examples.

According to the present invention, it has been discovered that the use of a minor amount of an aromatic tin compound as a catalyst during preparation of the polyetherurethane, especially during the process of foaming a polyetherurethane, will serve not only to properly catalyze the reaction but also to protect the polyurethane against heat degradation and the like. Use of the catalysts of this invention does not necessitate the addition of antidegradants or other materials to prevent deterioration due to dry heat ageing. These catalysts are particularly useful in the "One-Shot" process of making polyetherurethane foams since they avoid the necessity of making a prepolymer. The resulting products do not exhibit discoloration nor crumbling after curing and after ageing.

When cellular products or foams are made in which said aromatic tin compound has been incorporated during preparation, it has been observed that the center of the foams after formation are not crumbly nor discolored. Even after extended heat aging, for example, dry heat aging, these foams are not crumbly and only very slightly discolored. The use of this aromatic tin compound is particularly effective in those cases in which flexible cellular polyetherurethanes are to be produced and in which silicones are employed. Although these aromatic tin catalysts are especially useful in catalyzing a reaction to produce flexible polyetherurethane foams and in protecting the resulting flexible polyetherurethane foam against heat decomposition, the present invention in its broad aspects contemplates the use of these aromatic tin compounds in still other polyurethane systems, such as in the manufacture of rigid and semi-rigid polyetherurethane foams, thermosetting and thermoplastic polyetherurethanes, and solid polyetherurethanes to catalyze the urethane reaction and also to protect the polyurethanes against heat degradation and the like. These catalysts, also, are useful in urethane systems employing a major amount of a polyether and a minor amount of a polyester so that the resulting polyurethane contains a major amount of ether groups or linkages as compared to ester linkages; and for the purposes of the present invention such urethanes will be considered as polyetherurethanes.

The aromatic tin compounds used in the practice of the present invention have the following formulae:

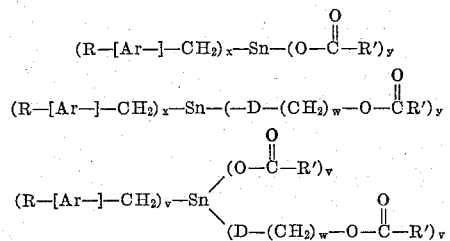

and

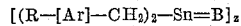

In these formulae R is hydrogen or an alkyl radical of from 1 to 5 carbon atoms, preferably a branched chain alkyl radical; and R' is hydrogen, an alkyl group of from 1 to 17 carbon atoms or an aliphatic hydrocarbon radical having from 1 to 3, preferably only one, ethylenic (carbon-to-carbon double bond) linkage and from 2 to 17 carbon atoms. B is selected from the group consisting of oxygen, sulfur (preferred for better aging properties), selenium and tellurium and

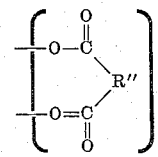

radicals where R" is a carbon to carbon valence bond or link, an alkylene radical of from 1 to 16 carbon atoms, an aliphatic hydrocarbon radical having from 1 to 3, preferably only one, ethylenic (carbon-to-carbon double bond) linkage and from 2 to 16 carbon atoms or is part of a (fused) aromatic ring such as part of a phenyl, naphthyl, anthryl or biphenyl radical and their monoalkyl ring substituted radicals in which the alkyl group has from 1 to 5 carbon atoms (preferably branched). Ar is a phenyl, naphthyl, anthryl or biphenyl radical; $v$ is a number from 1 to 2; $w$ is a number from 1 to 18; $x$ is a number from 1 to 3; $y$ is a number from 3 to 1; Sn has a valence of 4; and all of the tin valences are satisfied by the foregoing organic and inorganic radicals. D is an element selected from the group consisting of oxygen, sulfur (preferred for better aging properties), selenium and tellurium. Mixtures of the different radicals can be used on the same tin nucleus; and mixtures of the various tin compounds contemplated by the above formulae can be used. Dimers and trimers of the latter shown formula can also be used, i.e., where z is 2 or 3 instead of 1.

The above tin compounds can readily be prepared by reacting an aromatic tin halide with the alkali salt of the desired acid. For example, tribenzyl tin chloride (10) is reacted in hot benzene (20) with the calculated amount of sodium acetate, filtered while hot, and permitted to stand to form the product tribenzyl tin acetate having a M.P. of 117–118° C. (from $C_6H_6$). The lauryl, stearyl and other ester derivatives may be similarly prepared (Chem. Abstracts, 1956, 7856g). Dibenzyl tin maleate is prepared in similar fashion from dibenzyl tin dichloride and the disodium salt of maleic acid. Dibenzyl tin oxide is obtained by hydrolyzing dibenzyl tin dichloride with $NH_4OH$ or KOH. Dibenzyl tin sulfide is obtained by reacting benzyl chloride in dry ether with stannic chloride and magnesium; the resulting tribenzyl tin chloride is then reacted with hydrogen sulfide in anhydrous benzene to give dibenzyl tin sulfide

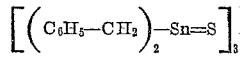

a trimer and benzyl chloride. Also, for example, dibenzyl tin di-mercapto-ethanol trimethyl hexanoic acid ester is prepared by adding to a reflux condenser one mole of mercapto ethanol, one mole of trimethyl-hexanoic acid and 200 ml. of benzene (to which .3 gram of p-toluene sulphonic acid is added). The ingredients are refluxed until 18 ml. of water has been eliminated by azeotropic distillation. 0.5 mole of dibenzyl tin oxide is added and refluxing is continued until the theoretical amount of water is distilled off. Slight impurities are drawn off and the excess benzene distilled. The residue obtained is a very viscous liquid which is slightly yellow in color and soluble in ether, chloroform, and toluene. Analysis for tin and sulfur gave:

|  | Sn | S |
|---|---|---|
| Calculated | 16.1 | 8.7 |
| Found | 16.0 | 8.8 |

These and other similar methods well known to those skilled in the art can be used to prepare the catalysts employed in the practice of the present invention.

Some specific examples of aromatic tin compounds which are used in accordance with the teachings of the present invention are dibenzyl tin dilaurate; dibenzyl tin dioleate; dibenzyl tin dihexoate; dibenzyl tin di-2-ethyl hexoate; dibenzyl tin diacetate; tribenzyl tin laurate; benzyl tin tristearate; di(o-phenyl benzyl) tin di-formate; m-phenyl benzyl, benzyl tin dipalmitate; dianthryl-alpha-methylene tin oxalate; benzyl tin di-butyrate, caprate; di(naphthyl-alpha-methylene) tin phthalate; tri(p-phenyl benzyl) tin caproate; di(o-butyl benzyl) tin suberate; m-ethyl benzyl tin tripropionate; di(1-methyl-anthryl-3-methylene) tin succinate; di(1-methyl-naphthyl-4-methylene) tin adipate; benzyl, o-butyl benzyl tin dielaidanate; di(2-methyl phenyl-benzyl-2') tin camphorate; benzyl, o-phenyl benzyl tin citraconate; dibenzyl tin fumarate; benzyl, anthryl-alpha-methylene tin glutarate; dibenzyl tin maleate; dibenzyl tin malonate; benzyl, o-phenyl benzyl, m-ethyl benzyl tin stearate; benzyl tin formate, -hexoate, -oleate; the dibenzyl tin ester of 1,2-naphthalene dicarboxylic acid; dibenzyl tin oxide; dibenzyl tin sulfide; di(o-phenyl benzyl) tin selenide; di(naphthyl-alpha-methylene) tin telluride; di-benzyl tin sulfide trimer; dibenzyl tin selenide trimer; dibenzyl tin di-mercapto ethanol lauric acid ester; dibenzyl tin di-mercapto butanol trimethyl-hexanoic acid ester; dibenzyl tin dimercaptide of iso-octyl mercapto acetate; tri benzyl tin mercapto butanol 2-ethyl hexoic acid ester; dibenzyl tin-acetate, -mercapto ethanol lauric acid ester; benzyl tin diacetate, -mercapto ethanol lauric acid ester; and the like and mixtures thereof.

The aromatic tin catalyst is used in a minor amount by weight as compared to the polyol and as necessary to catalyze the reaction between the polyisocyanate and the polyol(s) and to prevent dry heat degradation. While the amounts may vary over a relatively wide range depending on the molecular weight of the catalyst and/or polyol, large amounts are wasteful and may tend to change the physical properties desired in the resulting polyurethane. In general, from about 0.05 to 2.0 percent by weight, preferably from 0.1 to 0.8% by weight, of the aromatic tin catalyst based on the weight of the polyol present is used.

The aromatic tin catalyst is added either to the polyether or to an isocyanate modified polyether (a prepolymer). It, also, may be added to the isocyanate provided none of the other reactants are present or to the other ingredients prior to the reaction forming the polyurethane. However, it can be added to all the ingredients at one time. This is especially desirable in the "One-Shot" process in which all of the polyurethane forming materials are mixed together at one time.

The products of the present invention may be solid, porous, flexible, rigid or semi-rigid. The degree of flexibility, rigidity and/or porosity depends on the degree of linearity or branching of the polyether or polyisocyanate and whether or not blowing agents are employed. In general, branch chain polymers or a major amount of said polymers are employed to make foam products.

The polyether polyols (polyalkyleneether glycols) employed in the practice of the present invention may be obtained from alkylene oxides, glycols, heterocyclic ethers and other materials by polymerization, copolymerization and the like. For example, tetrahydrofuran may be polymerized in the presence of catalytic amounts of fluorosulfonic acid to make polytetramethylene ether glycol having the formula

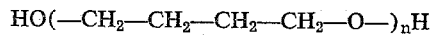

where $n$ is an integer. Glycols may also be polymerized in the presence of mineral acids, sulfonic acid or fuller's earth. Still other methods well known to those skilled in the art may be utilized in the preparation of these polyalkyleneether glycols. The linear polyaklylene ether glycols have at least three carbon atoms in their alkylene groups and can have as high as 8 or more carbon atoms in their alkylene groups. Useful examples of polyether glycols are polypropylene ether glycol, polyethylene-propylene ether glycol, polytetramethylene ether glycol, polypentamethylene ether glycol, polyhexamethylene ether glycol, poly-1,6-octamethylene ether glycol and the like and mixtures thereof.

Branch chain polyether polyols may be obtained by reacting glycols or alkylene oxides or mixtures thereof and the like with materials such as sucrose, sorbitol, styrene-vinyl alcohol copolymers, hexanetriol, pentaerythritol, glycerol, phloroglucinol, trimethylol phenol, trimethylol benzene, trimethylol propane and the like. In making foams which are rigid, it is generally preferred to employ the low molecular weight branch chain polyether polyols, whereas in making flexible materials it is preferred to employ the high molecular weight branch chain polyols.

The average molecular weight of the polyetherpolyols may vary from about 175 to 5000 or more. When making flexible polyetherurethane foams, it is preferred to employ branch chain polyethers having an average molecular weight of from about 2000 to 4000 and at least 3 reactive hydroxyl groups.

In some polyurethane formulations it is not necessary to use crosslinking materials. However, when employed, they may contain from 2 up to 8 or more reactive hydroxyl radicals. Their molecular weight can be low or it can be as high as the polyethers disclosed hereinabove which can be employed and which are highly branched such as a reaction product of glycerol and propylene oxide or hexane triol and propylene oxide and the other polyether polyols mentioned above. Still other materials which can be used as crosslinking polyols are pentaerythritol, glycol, glycerol, trimethylol propane, phenyl trimethylol methane, 1,2,4-butanetriol, 1,1,1-trimethylol hexane, pentaerythritol monoleate, 1,4-butanediol, 1,2,6-hexane triol, N,N,N',N'-tetrakis (2-hydroxypropyl) ethylene diamine, "Hyprose SP–80" (the reaction product of a sucrose with 8 equivalents of propylene oxide to give a compound having 36 carbon atoms and eight reactive hydroxyl groups, Dow Chemical Company), and the like. Mixtures of these materials are useful.

The polyethers should contain at least 3 carbon atoms between ether linkages to avoid water sensitivity. However, ethyl linkages can be used provided a substantial amount of the other linkages contain 3 or more carbon atoms. While unsaturated polyethers and polyols may be employed, it is much preferred to use materials which are saturated or essentially saturated. The polyethers, also, should be substantially or essentially hydroxyl terminated. It, moreover, is preferred that the OH groups be primary or secondary and it is even more preferred that the OH groups of the polyethers and crosslinkers be primary OH groups to improve heat stability.

As pointed out hereinabove minor amounts of polyesters or polyester polyols may be used with the polyethers so long as the resulting polyurethane or polyurethane mixture contains a major or predominating amount of ether linkages as compared to ester linkages and so that the polyurethane is considered to be a polyether-urethane. The polyesters should be essentially or substantially linear and hydroxyl terminated, should have an average molecular weight of from about 600 to 3000 or more and should have an acid number less than 10 and preferably less than 3. The polyester is normally prepared by the esterification of at least one aliphatic dibasic acid or an anhydride thereof with at least one glycol. Ratios of more than one mole of glycol to acid are used so as to obtain chains containing a preponderance of terminal hydroxyl groups. The acids used in making the linear polyesters are generally aliphatic dicarboxylic acids having the formula

HOOC—R—COOH where R is an alkylene radical having from 2 to 8 carbon atoms. Preferably, these acids have the formula $HOOC(CH_2)_xCOOH$ where $x$ is a number from 3 to 8. The anhydrides of the acids can also be used. Mixtures of acids and their anhydrides may be employed. Some examples of dicarboxylic acids are adipic, succinic, pimelic, suberic, azelaic, and sebacic acids. The glycols used in making the linear esters generally contain from 4 to 10 carbon atoms. Preferably, in making linear polyesters, the glycols have the formula $HO(CH_2)_yOH$ where $y$ is a number from 4 to 8. Mixtures of the glycols can be employed and examples of useful glycols are butanediol-1,4, hexamethylene diol-1,6, octamethylene diol-1,8 and the like. The polyesters can also be made by transesterification and other processes. Mixtures of polyesters can be employed.

Where branch chain polyesters are desired, they may be obtained by the reaction of polyols such as glycerol, hexanetriol, pentaerythritol and the like with dicarboxylic and other polycarboxylic acids.

The polyester, also, can be made with minor amounts of diamines or amino alcohols to provide the polyester with a small number of amide linkages and amine termination. However, the diamines or amino alcohols should be used in the amount of 25 mole percent or less so that the polyester contains a preponderance of ester linkages and a minor amount of amide linkages and is considered to be a polyester.

The glycerides of ricinoleic acid, castor oil, alkyd resins etc. can also be utilized in minor amounts.

It is preferred that the polyester when used contain a substantial number of carbon linkages of at least 3 carbon atoms between ester linkages, be saturated, and contain primary or secondary OH termination, more preferably primary OH termination. Instead of using mixtures of polyesters and polyethers, these materials or mixtures of dicarboxylic acids and polyetherglycols and the like may be reacted together to form a composite polyether-ester polyol containing a major or predominating amount of ether as compared to ester linkages. Mixtures of the various polyols disclosed herein such as polyethers, polyether-esters, polyethers-polyesters, and polyol crosslinking agents can be used in the practice of the present invention.

If the polyethers, polyesters, and polyols are impure or contain traces of catalysts etc. which would tend to speed their reaction with polyisocyanates where fast reactions are not wanted, they may be washed or otherwise treated to reduce this activity. The polyisocyanates may be recrystallized or distilled to purify them.

The polyisocyanate used in the practice of the present invention may be any polyisocyanate having 2,3, or more functional or reactive isocyanato groups. They may be aromatic, aliphatic or aliphatic-aromatic compounds. Examples of useful polyisocyanates which may be employed are tolylene diisocyanate, p,p'-diisocyanato diphenylmethane, dimethyl diphenylmethane diisocyanate, bitoylene diisocyanate, dibenzyl diisocyanate, durene diisocyanate (2,3,5,6-tetramethylparaphenylene diisocyanate), diphenyl dimethyl methane diisocyanate, hexamethylene diisocyanate, naphthalene-1,5-diisocyanate, naphthalene triisocyanate, dichlorodiphenyl methane diisocyanate, metaphenylene diisocyanate, paraphenylene diisocyanate, diphenylene ether diisocyanate, and polyaryl polyisocyanates such as "Papi" (The Carwin Company, North Haven, Conn.); having the general formula

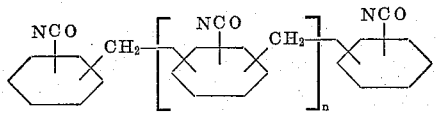

where $n$ has an average value of 1. Still other polyisocyanates can be employed. Mixtures of the polyisocyanates can be used, for example, an 80–20 or 65–35 mixture of 2,4- and 2,6-tolylene diisocyanates or other polyisocyanate mixtures can be used. A preferred class of diisocyanates to use including the tolylene diisocyanates has the general formula:

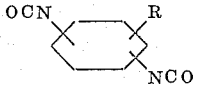

where R is selected from the group consisting of hydrogen, methyl, ethyl, propyl, isopropyl, butyl, amyl, hexyl, and the other lower molecular weight alkyl radicals.

The amounts of polyethers, crosslinker (if used), polyetherpolyester mixture and polyisocyanate employed depend on the degree of chain extension and crosslinking desired, as well as on the type of polyl or polyisocyanate used and the ultimate type of product desired and its properties. In general, in the practice of the present invention there can be employed from about 0.5 to 12 equivalents of isocyanate per equivalent of polyether hydroxyl or polyether-polyester (mixed) hydroxyl and from about 0.05 to 5 equivalents of polyol crosslinker hydroxyl per equivalent of polyether hydroxyl or polyether-ester (mixed) hydroxyl. The product of the present invention can contain residual hydroxyl or isocyanato groups or the reactants can be so balanced that the final product contains essentially no unreacted isocyanato and/or hydroxyl groups. In some instances a product containing residual isocyanato groups is obtained to take advantage of post curing when desired.

A small amount of water (about 0.5 to 5.0% by weight based on the weight of polyol present) as a blowing agent can be added to the reaction mixture to make foam. It can be mixed with the other reactants at the same time in a one-step foaming process. The water may first be added to the polyether or polyetherester but can be introduced to the foaming nozzle at the same time as the other ingredients. If a prepolymer is to be made, it is desirable that the reactants be substantially anhydrous to avoid the formation of urea groups so that in this case the water should be added at about the time of foaming. Lithium aluminum hydride can be used with water as a blowing agent. In place of water or water activated materials, other blowing agents can be used such as the liquid fluoro- or chlorofluoroalkanes (the "Freons"), liquefied hydrocarbon gases, such as methane, ethane and the like as shown in prior copending application of Charles B. Frost, Serial No. 803,381, filed April 1, 1959, entitled "Polyetherurethane Foams and Method of Making Same," now U.S. Patent No. 3,072,582. Mixtures of the liquefied gases can be used. Mixtures of water and the "Freons" may likewise be used. The liquid organic blowing or foaming materials may be used in an amount of from about 2 to 40%, preferably from 9 to 30%, by weight based on the total weight of the polyurethane forming materials.

When water is added to the urethane reaction mixture to effect blowing, it is desirable, but not absolutely necessary, to employ additionally amine catalysts to facilitate reaction between the isocyanato radicals and the water hydroxyl. Useful amine catalysts are the tertiary amines, for example, triethyl amine, 4-N-amyl pyridine, tri-hexylamine, N-methyl morpholine, 4-pyridine propanol, 2-ethanol pyridine, di(ethylene amino ethanol) adipate, dibutyl amino ethanol, N,N'-diethyl-2-methyl piperazine and the like. These amine catalysts are generally used in an amount from about 0.05 to 2.5% by weight based on the total weight of the polyol used although other amounts may be employed. It generally is preferred to employ just the amount of amine needed to obtain the desired rate of reaction to avoid waste of the catalyst, to reduce the possibility of deterioration of the product and to reduce the odor level.

Other additives may be added to the reaction mixture of the present invention, such as the silicones includng the siloxane-oxyalkylene block copolymers and silicone oils as shown in copending applications of George T. Gmitter and Edwin M. Maxey, S.N. 790,323, filed February 2, 1959, and entitled "Polyurethane Foam and One-Step Method of Making Same," and of George T. Gmitter, S.N. 707,351, filed January 6, 1958, for "Process for Producing Cellular Polyetherurethane Elastomers Using Silicone Oils," now abandoned. Other silicones or silanes such as vinyl triethoxy silane, butyl triethoxy silane, amyl triethoxy silane and other monomeric and polymeric organic silanes and silicones and the like are useful in the practice of the present invention. Only small amounts of silicones should be used with the polyether-polyester type foams while much larger amounts can be used with the polyether type. The emulsifiers, if used, are preferably anionic or nonionic and also preferably are nonacidic or substantially nonacidic. Wetting agents, carbon black, $TiO_2$, $SiO_2$ containing materials, wood flour, metal flakes, organic and inorganic synthetic and natural fibers (wool, cellulose, nylon, glass etc. (surface treated or not)), color pigments and dyes, antioxidants, antiozonants or antidegradants, deodorants, fungicides, plasticizers, rubbers, resins, fire retardants and so forth, also, are useful additives in the reaction mixture. If a foam is to be made using water, the water can be added in the form of a natural or synthetic rubber and/or resin latex.

As pointed out above antioxidants, antiozonants and/or antidegradants can be used but are not necessary since a feature of the present catalyst is that it combines both catalytic and anti-degradant properties. However, if desired, anti-degradants can be used such as alkyl substituted phenols, N,N'-dialkyl substituted phenylene diamines, alkyl and aryl phosphites and the like as shown in copending application of Gilbert H. Swart, George T. Gmitter and Louis Nicholas, S.N. 660,067, filed May 20, 1957, and entitled "Improving the Stability of Polyether Glycol Urethane Products," now U.S. Patent No. 2,915,496, dated December 1, 1959. Halogenated organic phosphites, such as halogenated aryl, alkyl, alkaryl, aralkyl and cycloaliphatic phosphites and the like and mixtures thereof can also be employed as shown in copending application of George T. Gmitter, S.N. 810,992, filed May 5, 1959, and entitled "Compositions and Methods of Making the Same." Still other antidegradants can be used.

In making the products of the present invention the polyisocyanate may be reacted with the polyether or polyether-polyester mix etc. and then a crosslinker as desired to form a finish product. However, the polyisocyanate may first be reacted with the crosslinker preferably in the presence of the aromatic tin catalyst and then with the polyether. A prepolymer of a polyether and polyisocyanate may be formed using the aromatic tin catalyst of this invention. Also, it is not necessary always to use the crosslinker but by proper selection of the polyether employed it will only be necessary to react the polyisocyanate with the polyether or polyether-polyester mixture etc. to obtain the desired products. The use of the aromatic tin catalyst is particularly effective in a "One-Shot" process where all of the ingredients are pumped (and heated as necessary) to the nozzle of a foaming machine where they are intimately mixed together and then delivered or dumped into pans or forms wherein the reaction mixture is allowed to foam and cure. Heat is applied as necessary to insure the proper reaction, chain extension, crosslinking, cell formation and vaporization or decomposition of the blowing agent. After curing, the foam can be either heated or aged as desired to improve its properties. Such aging may be conducted in a moist atmosphere. Furthermore, flexible foams can be squeezed or wrung after curing to break the cell walls to increase their mositure vapor transmission and their resilience in some instances. If heated, during the squeezing operation, some of the catalyst or catalyst products or residues may be evolved if vaporizable and not trapped within the polyurethane itself.

The products of the present invention are useful in making rubbery, resilient, flexible, semi-rigid, rigid, cellular (open or closed cell) or non-cellular, gum and other polyurethanes and the like. They, also, may be thermoplastic or thermosetting and can be made into liquid form for casting purposes or as adhesives. Films or coatings, molded goods and extrusions can be made from the materials of the present invention. Some specific examples of useful articles which can be made from the products of the present invention are shoe heels and soles, belts, bumpers, carpet underlays, pallet rollers, tires, coated tarpaulins, pillows, potting compounds, insulated boots, mattresses, cushioning for furniture, and door panels; insulation for food containers, refrigerators, and inaccessible pipe clusters, sandwich contruction for panels, walls of building, vehicles, and the like; buoyant elements for boats, buoys, life rafts and life preservers; lightweight reinforcing material for aircraft etc.

It is not precisely known how the aromatic tin catalysts or their residues prevent or retard heat aging of polyurethanes during and after curing. In particular with reference to foamed urethanes, it will be appreciated that the foams have relatively high exotherms. That is, the exothermic heat of reaction is relatively high, and since the foam acts as an insulator, this heat plus any heat applied to initiate foaming and curing does not readily escape, yet in such situations the aromatic tin catalyst or its residue prevents heat degradation. In the presence of other catalysts under these heating conditions and without any antidegradant, reversion or decomposition of the foam occurs apparently due to and accelerated by the other catalysts or to some decomposition products of the other catalysts under the conditions existing. On the other hand the aromatic tin catalyst of this invention may be unusually stable by virtue of resonance due to the aromatic (benzyl) radicals or because these radicals form dibenzyl and the like, and thus, resist a possible free radical mechanism type degradation. The aromatic tin catalyst, also, may react with the polyurethane itself in such a fashion that it reunites urethane, ester or ether bonds as fast as they are broken. The aromatic tin catalyst or its residue if it breaks down may also be acting as a powerful antioxidant. In any event whatever may be the true explanation, it has been found that the use of these aromatic tin catalysts greatly retards the decomposition of polyurethanes; particularly it prevents the decomposition of flexible polyether foams during foaming and curing and even after extended dry heat aging so that the discoloration and crumbling obtained on curing or heat aging are not observed. Even when aromatic diisocyanates which normally give discolored products on heat aging are used, the degree of discoloration is greatly minimized.

The following examples will serve to illustrate the invention with more particularity to those skilled in the art:

*Example I*

75 parts of NIAX triol LG–56, 0.2 part of dibenzyl tin dilaurate, 0.5 part of a silicone block copolymer, 2.6 parts of water, 0.11 part of N-methylmorpholine, 0.075 part of "Dabco" (cyclic triethylene diamine,

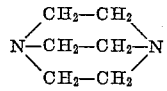

Houdry Process Corp.), and 34.0 parts of an 80/20 mixture of 2,4- and 2,6-tolylene diisocyanate (all parts being by weight) were introduced into the nozzle of a foaming machine where the ingredients were thoroughly mixed and the mixture was then dumped into a pan. After foaming and curing, the flexible foamed product was crushed or squeezed by passing between rollers to produce essentially a 100% open cell structure and then was tested as to density, percent rebound and 25% compression deflection. It was also heated in a laboratory oven at various temperatures for many hours. Similar products were made in which dibenzyl tin di-2-ethyl hexoate or dibutyl tin dilaurate was used in place of the dibenzyl tin dilaurate, and the same test procedures were followed. The results obtained on testing these flexible products are as follows:

Carbide Corporation. The silicone has the general formula:

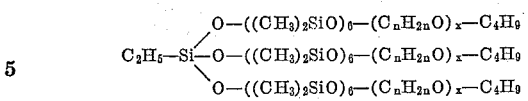

where $(C_nH_{2n}O)_x$ is a mixed polyoxyethylene-oxypropylene block containing about 17 oxyethylene and 13 oxypropylene units.

*Example II*

The method of this example was the same as that of Example I, above, except that di-butyl tin di-2-ethyl hexoate and dibutyl tin di-acetate were used in place of di-butyl tin dilaurate. The results obtained were essentially the same as those obtained when dibutyl tin dilaurate was employed in that the resulting foams were unstable and were degraded in a few hours after heating in an oven at from 140 to 160° C.

Moreover, initial examinations were made of the flexible polyetherurethane foams of Examples I and II, above, in that portions of the foams were cut open after curing but before heat aging. The centers or inner portions of the foams catalyzed with the dibenzyl tin compounds were not discolored nor crumbly whereas the centers of the foams catalyzed with the non-aromatic tin compounds were discolored (brown) and crumbly.

*Example III*

The method of this example was the same as that of Example I, above, except that diphenyl tin dilaurate, ditolyl tin diacetate, and di(phenyl ethylene) tin di-acetate were each substituted for the dibenzyl tin di-laurate catalyst. The foaming action was slow; and on heat aging, the resulting foams degraded badly in a few hours when heated to a temperature of 140° C. in the oven. These results show that these catalysts containing no methylene group between the aromatic radical and the tin or containing more than one methylene group between the aromatic radical and the tin are unsatisfactory. This example shows that there can be only one methylene group between the tin radical and the aromatic radical or nucleus.

*Example IV*

The method of this example was the same as that of Example I, above, except that tetra benzyl tin was used in place of dibenzyl tin di-laurate. The resulting polyol-diisocyanate reaction was very slow in that the composition foamed faster than the desired concurrent rate of crosslinking so that at completion of the reaction, the foam tended to collapse. The resulting physical properties of the foam, also, were unsatisfactory although no crumbly condition was apparent in this foam. This example shows that when all of the valences (4) of the

| Catalyst | Amt. Cat. | Foam Density, lbs./Cu. Ft. | Schopper Rebound, percent | 25% Comp. Defl., Lb./10 Sq. In. | Dry Heat Aging in Oven at 140° C. | Dry Heat Aging in Oven at 160° C. |
|---|---|---|---|---|---|---|
| Dibenzyl tin dilaurate | 0.2 | 2.24 | 47 | 5 | Stable, no chg. after 350 hrs | Not Tested. |
| Dibenzyl tin di-2-ethyl-hexoate. | 0.2 | 2.28 | 42 | 5.25 | ----do---- | Stable, no chg. after 120 hrs. |
| Do | 0.5 | 2.17 | 52 | 8.25 | ----do---- | Stable, no chg. until after 39 hrs. |
| Dibutyl tin dilaurate | 0.2 | 2.2 | 42 | 5.25 | Unstable, degraded, crumbly and discolored after 4 hrs. | Unstable, degraded, crumbly and discolored after 2 hrs. |

These results show that while some of the initial physical properties of the foams are similar, the aromatic tin catalysts provide unexpectedly great resistance to dry heat degradation at elevated temperatures. "LG–56" triol is a propylene oxide adduct of glycerol containing substantially 90 to 95% secondary hydroxyl radicals, an OH number of about 56, and an average molecular weight of from about 2800 to 3100 and is made by The Union tin were substituted with benzyl radicals unsatisfactory results are obtained. Hence, the tin catalyst should have no more than 3 valences containing aromatic and similar groups.

*Example V*

The method of this example was the same as that of Example I, above, except that tetra butyl tin and tin tetra laurate were substituted in place of di-butyl tin di-laurate.

The resulting foams degraded in approximately the same time as the dibutyl tin di-laurate. These results show that it is necessary for the tin catalyst to have benzyl or other aromatic radicals as defined above to prevent heat degradation.

*Example VI*

The method of this example was the same as that of Example I, above, except that dibenzyl dibutyl tin was used in place of dibutyl tin di-laurate. The resulting foam exhibited the same properties as one using the dibutyl tin di-laurate as catalyst. This result shows that the presence of alkyl groups directly attached to the tin rather than ester/groups, even if benzyl groups are present, will not afford the desired properties.

It is to be understood that in accordance with the provisions of the patent statutes, the particular form of composition or product shown and described and the particular procedure set forth are presented for purposes of explanation and illustration and that various modifications of said composition or product and procedure can be made without departing from this invention.

Having thus described the invention, what is claimed is:

1. The method which comprises reacting (1) at least one organic polyisocyanate with (2) at least one polyol selected from the group consisting of a polyether polyol, a mixture of a major amount of a polyether polyol and a minor amount of a polyester polyol and a polyetherester polyol having a major amount of ether linkages as compared to ester linkages and containing at least two active hydroxyl radicals in amounts sufficient to form a polyurethane in admixture with (3) a minor amount by weight, based on the total weight of polyol present and sufficient to catalyze the reaction between said polyisocyanate and said polyol and to prevent dry heat degradation of the resulting polyurethane, of an aromatic tin catalyst selected from at least one catalyst of the group having the formulae:

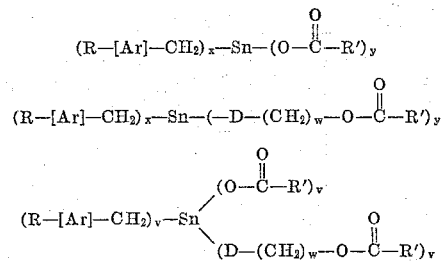

and

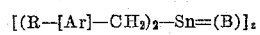

where R is selected from the group consisting of hydrogen and an alkyl radical of from 1 to 5 carbon atoms; R' is selected from the group consisting of hydrogen, an alkyl radical of from 1 to 17 carbon atoms, and an aliphatic hydrocarbon radical having from 1 to 3 ethylenic linkages and from 2 to 17 carbon atoms; B is selected from the group consisting of oxygen, sulfur, selenium, tellurium and

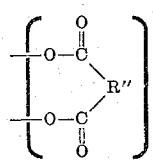

radicals where R" is selected from the group consisting of a carbon-to-carbon valence bond, an alkylene radical of from 1 to 16 carbon atoms, an aliphatic hydrocarbon radical having from 1 to 3 ethylenic linkages and from 2 to 16 carbon atoms, and an aromatic nucleus selected from the group consisting of phenyl, naphthyl, anthryl and biphenyl radicals and their mono alkyl ring substituted derivatives in which the alkyl substituent has from 1 to 5 carbon atoms; D is an element selected from the group consisting of oxygen, sulfur, selenium and tellurium; Ar is selected from the group consisting of phenyl, naphthyl, anthryl, and biphenyl radicals; $v$ is a number from 1 to 2; $w$ is a number from 1 to 18; $x$ is a number from 1 to 3; $y$ is a number from 3 to 1; the total of $x$ plus $y$ is 4; $z$ is a number from 1 to 3; and Sn is tin having a valence of four and has no unsatisfied valences.

2. The method according to claim 1 in which said polyether polyol is a branched chain polyalkyleneether polyol having at least 3 reactive hydroxyl groups and an average molecular weight of from about 2,000 to 4,000, said aromatic tin catalyst is present in an amount of from about 0.05 to 2.0% by weight based on the weight of said polyalkyleneether polyol, and said polyisocyanate is an aromatic diisocyanate.

3. The method according to claim 2 in which the reaction of said polyisocyanate and said polyol is conducted additionally with a minor amount by weight of water sufficient to provide foaming.

4. The method according to claim 3 in which the reaction of said polyisocyanate and said polyol is conducted additionally in admixture with a tertiary amine catalyst in an amount of from about 0.05 to 2.5% by weight based on the weight of said polyol.

5. The method according to claim 4 in which said aromatic tin catalyst is dibenzyl tin dilaurate.

6. The method according to claim 4 in which said aromatic tin catalyst is dibenzyl tin diacetate.

7. The method according to claim 4 in which said aromatic tin catalyst is dibenzyl tin di-2-ethyl hexoate.

8. The method according to claim 4 in which said aromatic tin catalyst is dibenzyl tin dioleate.

9. The method according to claim 4 in which said aromatic tin catalyst is tribenzyl tin laurate.

10. In the method of making a polyetherurethane wherein (1) at least one organic polyisocyanate is reacted with (2) at least one polyether polyol in amounts sufficient to form a polyetherurethane, the improvement comprising reacting said polyisocyanate and said polyol in admixture with (3) a minor amount by weight based on the total weight of polyol present of an aromatic tin catalyst sufficient to catalyze said reaction and to prevent dry heat degradation of the resulting polyetherurethane, said aromatic tin catalysts being selected from at least one catalyst of the group having the formulae:

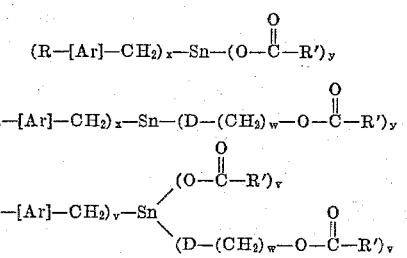

and

where R is selected from the group consisting of hydrogen and an alkyl radical of from 1 to 5 carbon atoms; R' is selected from the group consisting of hydrogen, an alkyl radical of from 1 to 17 carbon atoms, and an aliphatic hydrocarbon radical having from 1 to 3 ethylenic linkages and from 2 to 17 carbon atoms; B is selected from the group consisting of oxygen, sulfur, selenium, tellurium and

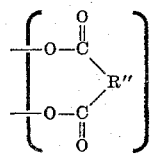

radicals where R" is selected from the group consisting of a carbon-to-carbon valence link, an alkylene radical of from 1 to 16 carbon atoms, an aliphatic hydrocarbon radical having from 1 to 3 ethylenic linkages and from 2 to 16 carbon atoms, and an aromatic nucleus selected from the group consisting of phenyl, naphthyl, anthryl and biphenyl radicals and their monoalkyl ring substituted derivatives in which the alkyl substituent has from 1 to 5 carbon atoms; D is an element selected from the group consisting of oxygen, sulfur, selenium and tellurium; Ar is selected from the group consisting of phenyl, naphthyl, anthryl, and bi-phenyl radicals; $v$ is a number from 1 to 2; $w$ is a number from 1 to 18; $x$ is a number from 1 to 3; $y$ is a number from 3 to 1; the total of $x$ plus $y$, is 4; $z$ is a number from 1 to 3; and Sn is tin having a valence of four and has no unsatisfied valences.

11. In the method of making a polyetherurethane according to claim 10, reacting said polyisocyanate and said polyol additionally with (3) a crosslinking polyol having from 2 to 8 reactive hydroxyl radicals.

12. The method of making a cellular polyetherurethane which comprises reacting (1) at least one organic polyisocyanate with (2) at least one polyol selected from the group consisting of a polyether polyol, a mixture of a major amount of a polyether polyol and a minor amount of a polyester polyol and a polyether-ester polyol having a major amount of ether linkages as compared to ester linkages and containing at least two active hydroxyl radicals in amounts sufficient to form a polyurethane prepolymer, and foaming said prepolymer with a foaming agent and in admixture with (3) a minor amount by weight, based on the total weight of polyol present and sufficient to catalyze the reaction and to prevent dry heat degradation of the resulting polyurethane, of an aromatic tin catalyst selected from at least one catalyst of the group having the formulae:

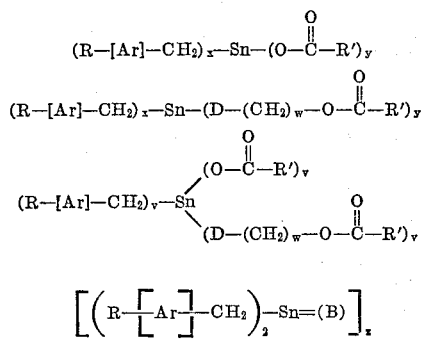

and where R is selected from the group consisting of hydrogen and an alkyl radical of from 1 to 5 carbon atoms; R' is selected from the group consisting of hydrogen, an alkyl radical of from 1 to 17 carbon atoms, and an aliphatic hydrocarbon radical having from 1 to 3 ethylenic linkages and from 2 to 17 carbon atoms; B is selected from the group consisting of oxygen, sulfur, selenium, tellurium and

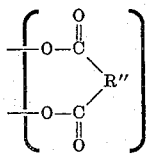

where R" is selected from the group consisting of a carbon-to-carbon valence bond, an alkylene radical of from 1 to 16 carbon atoms, an aliphatic hydrocarbon radical having from 1 to 3 ethylenic linkages and from 2 to 16 carbon atoms, and an aromatic nucleus selected from the group consisting of phenyl, naphthyl, anthryl and biphenyl radicals and their mono alkyl ring substituted derivatives in which the alkyl substituent has from 1 to 5 carbon atoms; D is an element selected from the group consisting of oxygen, sulfur, selenium and tellurium; Ar is selected from the group consisting of phenyl, naphthyl, anthryl, and biphenyl radicals; $v$ is a number from 1 to 2; $w$ is a number from 1 to 18; $x$ is a number from 1 to 3; $y$ is a number from 3 to 1; the total of $x+y$ is 4; $z$ is a number from 1 to 3; and Sn is tin having a valence of four and has no unsatisfied valences.

13. The method according to claim 12 in which the foaming agent is a minor amount by weight of water sufficient to provide said foaming.

14. The method according to claim 13 in which during foaming said prepolymer contains additionally in admixture therewith a tertiary amine catalyst in an amount of from about 0.05 to 2.5% by weight based on the weight of said polyol.

References Cited in the file of this patent

UNITED STATES PATENTS

| | | |
|---|---|---|
| 2,720,507 | Caldwell | Oct. 11, 1955 |
| 2,866,774 | Price | Dec. 30, 1958 |
| 2,888,411 | Pace | May 26, 1959 |
| 2,948,691 | Windemuth et al. | Aug. 9, 1960 |
| 2,955,056 | Knox | Oct. 4, 1960 |
| 3,039,976 | Barnes et al. | June 19, 1962 |
| 3,055,845 | Merten et al. | Sept. 25, 1962 |
| 3,084,177 | Hostettler et al. | Apr. 2, 1963 |

FOREIGN PATENTS

| | | |
|---|---|---|
| 1,212,252 | France | Oct. 19, 1959 |